(12) United States Patent
Hoshino et al.

(10) Patent No.: US 6,740,431 B2
(45) Date of Patent: May 25, 2004

(54) MEDIUM FOR IDENTIFYING MATTER TO BE IDENTIFIED AND METHOD FOR PRODUCTION THEREOF

(75) Inventors: Hidekazu Hoshino, Yokohama (JP); Itsuo Takeuchi, Yokohama (JP); Seiya Shibuya, Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 10/168,192

(22) PCT Filed: Oct. 18, 2001

(86) PCT No.: PCT/JP01/09157
§ 371 (c)(1),
(2), (4) Date: Jun. 19, 2002

(87) PCT Pub. No.: WO02/33453
PCT Pub. Date: Apr. 25, 2002

(65) Prior Publication Data
US 2003/0133098 A1 Jul. 17, 2003

(30) Foreign Application Priority Data
Oct. 19, 2000 (JP) .......................................... 2000-318779

(51) Int. Cl.[7] ................................................ B41M 3/12
(52) U.S. Cl. .......................................... 428/916; 283/83
(58) Field of Search .......................... 283/72, 74, 75, 283/77, 79, 80, 81, 82, 83, 84, 85, 86, 87, 45, 67, 71; 503/200, 227; 428/195, 913, 915, 916; 359/566, 572, 483, 484, 485, 486; 252/299.01

(56) References Cited

U.S. PATENT DOCUMENTS

| | | | | |
|---|---|---|---|---|
| 4,536,014 A | * | 8/1985 | Boutaleb et al. ............... 428/1 |
| 5,492,370 A | * | 2/1996 | Chatwin et al. ............ 283/110 |
| 5,629,055 A | * | 5/1997 | Revol et al. .................... 428/1 |
| 5,678,863 A | * | 10/1997 | Knight et al. ................ 283/113 |
| 5,688,738 A | * | 11/1997 | Lu ............................... 503/227 |
| 5,857,709 A | * | 1/1999 | Chock .......................... 283/86 |
| 6,061,122 A | * | 5/2000 | Hoshino et al. ............... 356/71 |
| 6,301,047 B1 | * | 10/2001 | Hoshino et al. ............. 359/566 |

FOREIGN PATENT DOCUMENTS

| | | | |
|---|---|---|---|
| EP | 435029 A2 | 7/1991 | |
| EP | 911758 A2 | 4/1999 | |
| EP | 1081728 A2 | 3/2001 | |
| JP | 63-51193 A | 3/1988 | |
| JP | 63-51193 A | 3/1988 | |
| JP | 11-157199 A | 6/1999 | |
| JP | 11-157200 A | 6/1999 | |
| JP | 11-157200 | * 6/1999 | ............ B41M/3/14 |
| JP | 11-277957 A | 10/1999 | |
| JP | 2000-25373 A | 1/2000 | |
| JP | 2000-318399 A | 11/2000 | |
| JP | 2001-56484 A | 2/2001 | |
| JP | 2001-105800 A | 4/2001 | |
| JP | 2001-232978 A | 8/2001 | |
| JP | 2001-242748 A | 9/2001 | |
| JP | 2001-246886 A | 9/2001 | |
| JP | 2000-255200 A | 9/2002 | |

OTHER PUBLICATIONS

*English translation of Mueller–Rees et al.*

* cited by examiner

Primary Examiner—Mark F. Huff
Assistant Examiner—Jennifer R. Sadula
(74) Attorney, Agent, or Firm—Marger Johnson & McCollom, P.C.

(57) ABSTRACT

In an identification medium for identifying an authenticity of an object either visually or optically by using an identification device, high polymer cholesteric liquid crystal is applied onto the object, onto a sticker adapted to be affixed to the object or onto a base for hot stamping onto the object, and the high polymer cholesteric liquid crystal is patterned, and/or a graphic representation layer such as a figure and letter is formed under or over the high polymer cholesteric liquid crystal to enhance the aesthetic quality of the identification medium or the object, and improve the capability to identify and prevent forgery.

8 Claims, 12 Drawing Sheets

MEDIUM FOR IDENTIFYING MATTER TO BE IDENTIFIED AND METHOD FOR PRODUCTION THEREOF

This application claims priority from PCT/JP01/09157, filed Oct. 18, 2001, and JP2000-318779, filed Oct. 19, 2000, incorporated herein by reference.

TECHNICAL FIELD

The present invention relates to a medium and method for preventing forgery of two-dimensional and three-dimensional objects such as passports, cards, security notes, gift certificates, pictures, public transportation tickets, and public betting tickets.

BACKGROUND OF THE INVENTION

Conventionally, hologram has been used as an identification medium for preventing the forgery of cards, security notes and coupons. However, as the fabrication of hologram gets easier over time, forgery has become more and more common, and some of the cases of forgery, in particular those in connection with media for visual identification, are so undistinguishable from authentic ones that it is virtually impossible to tell them apart. Therefore, there is a need for new identification media.

Japanese patent laid open publication (kokai) No. 63-51193 discloses the use of high polymer cholesteric liquid crystal as an identification medium, and the light reflected therefrom is detected either visually or by using an optical identification device.

Cholesteric liquid crystal normally has a layered structure, and the axial directions of the molecules in each layer are parallel to each other as well to the plane of the layer. Each layer is slightly twisted relative to the adjacent layer so that a three-dimensional spiral structure is produced. This structure demonstrates the property to selectively reflect a circularly polarized light having a wavelength of $\lambda$ which is given by $\lambda = n \cdot p$ where p is the depth of the layers for this axial direction to turn 360 degrees or the pitch, and n is the average index of refraction of each layer. Low polymer cholesteric liquid crystal is used for thermometers whose color changes with temperature because the pitch p distinctly changes with temperature as well as for display devices.

On the other hand, high polymer cholesteric liquid crystal is provided with a relatively fixed crystal structure so that the pitch p changes very little with temperature, magnetic field and electric field, and selectively reflects light of a certain predetermined color (wavelength). High polymer cholesteric liquid crystal can be prepared, for instance, by heating high polymer having a property to be formed into thermotropic cholesteric liquid crystal beyond the liquid crystal transition temperature to cause a liquid crystal structure to grow, and fixing the liquid crystal structure by rapidly cooling it.

For instance, when high polymer cholesteric liquid crystal that reflects red light having a prescribed wavelength $\lambda_R$ is placed over material which absorbs visible light such as black paper, and random light such as sun light is projected thereon, the transmissive light is totally absorbed by the underlying black paper, and only left circularly polarized light having the wavelength of $\lambda_R$ is reflected. It produces an attractive special color which may be called as cholesteric color. This light however can be shut off if a filter for blocking left circularly polarized light is placed thereon.

When high polymer cholesteric liquid crystal that reflects red light having a prescribed wavelength $\lambda_R$ is placed over material which reflects visible light such as white paper, and random light such as sun light is projected thereon, the underlying white color becomes visible. If a filter for transmitting only left circularly polarized light is placed thereon, only the reflected left circularly polarized light having the wavelength of $\lambda_R$ become visible as red light. If left circularly polarized light having the wavelength of $\lambda_R$ instead of sun light is projected thereon, only the reflected light having the wavelength of $\lambda_R$ becomes visible even without using a filter.

However, when reflected light is used for identification purpose, although the high polymer cholesteric liquid crystal demonstrates a unique cholesteric color, and is attractive in appearance, it cannot provide a generally agreeable appearance by itself, and has been considered inadequate as an identification medium of an object whose aesthetic appearance is important. The graphic shapes (graphic shapes and patterns) formed on the identification medium are also an important factor in identifying the object. In this regard also, a further improvement of identification media using high polymer cholesteric liquid crystal is desired.

BRIEF SUMMARY OF THE INVENTION

The present invention was made in view of such problems of the prior art, and its primary object is to provide an identification medium which provides an improved identification capability, is highly difficult to illicitly duplicate, is highly attractive in terms of both shape and color, and is easy to fabricate, and a method for making such an identification medium.

According to the present invention, such an object can be accomplished by providing an identification medium for identifying an authenticity of an object either visually or optically by using an identification device, characterized by that: the identification medium comprises high polymer cholesteric liquid crystal which is patterned, and/or a graphic representation layer such as a figure and letter which underlies or overlies high polymer cholesteric liquid crystal, and by providing a method for making an identification medium for identifying an authenticity of an object either visually or optically by using an identification device, characterized by the steps of: applying high polymer cholesteric liquid crystal onto the object, onto a sticker adapted to be affixed to the object or onto a base for hot stamping onto the object, and patterning the high polymer cholesteric liquid crystal, and/or forming a graphic representation layer such as a figure and letter under or over the high polymer cholesteric liquid crystal.

This enhances the aesthetic appearance, and improves the capability to identify the object and prevent an illicit duplication of the object.

In particular, by patterning the high polymer cholesteric liquid crystal by etching or by using laser, the high polymer cholesteric liquid crystal can be accurately and easily patterned into a desired shape so that its aesthetic appearance and identification capability can be both improved. By printing on the high polymer cholesteric liquid crystal, the printed color shows on the printed part and the cholesteric color shows on the exposed surface of the high polymer cholesteric liquid crystal so that the freedom in design is enhanced. By thermally transferring the high polymer cholesteric liquid crystal according to a prescribed pattern, small batch production is facilitated. By partly modifying the high polymer cholesteric liquid crystal by laser, the high polymer cholesteric liquid crystal is provided with partly different optical properties, and its aesthetic appearance and identification capability can be both improved.

BRIEF DESCRIPTION OF THE DRAWINGS

Now the present invention is described in the following with reference to the appended drawings, in which:

FIG. 17b is a sectional side view taken along line XVII—XVII of FIG. 17a;

FIG. 18b is a sectional side view taken along line XVII—XVII of FIG. 18a.

DETAILED DESCRIPTION OF THE PREFERRED EMBODIMENTS

Preferred embodiments of the present invention are described in the following.

Figure 1:
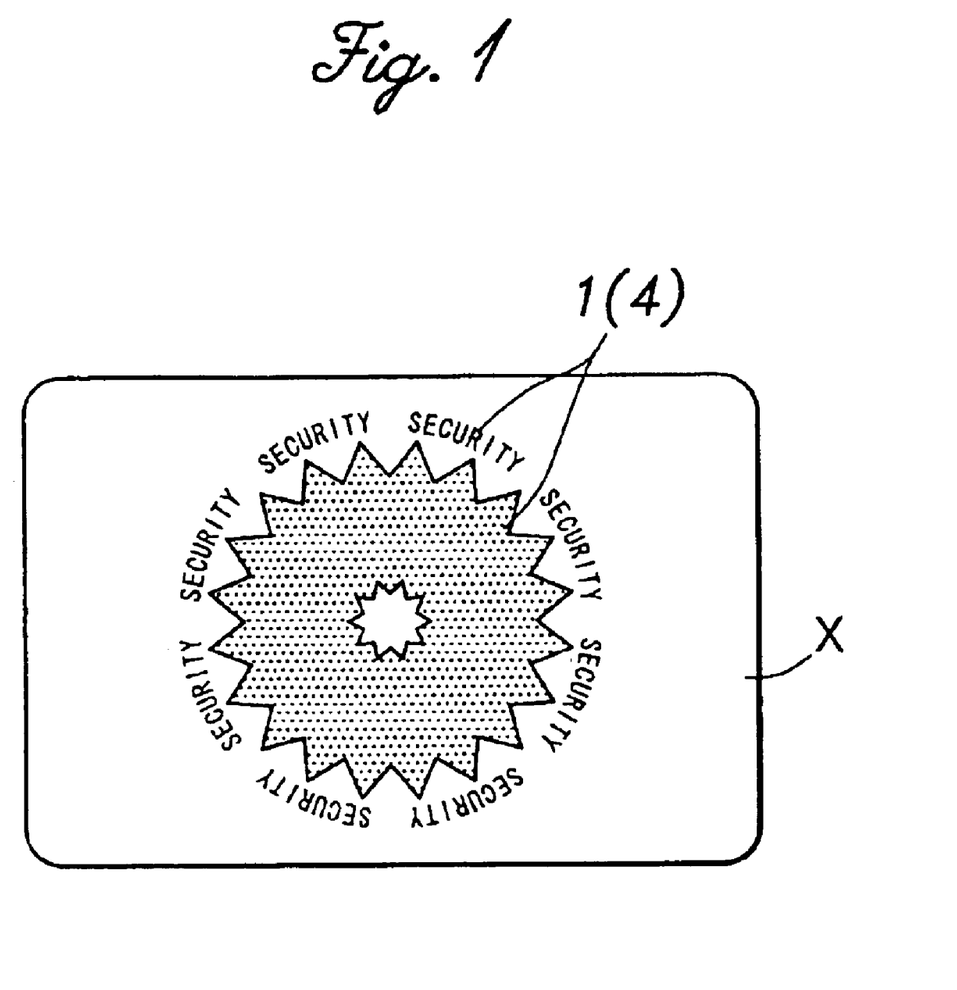
FIG. 1 is a plan view showing an identification medium given as a first embodiment of the present invention.
Figure 2:
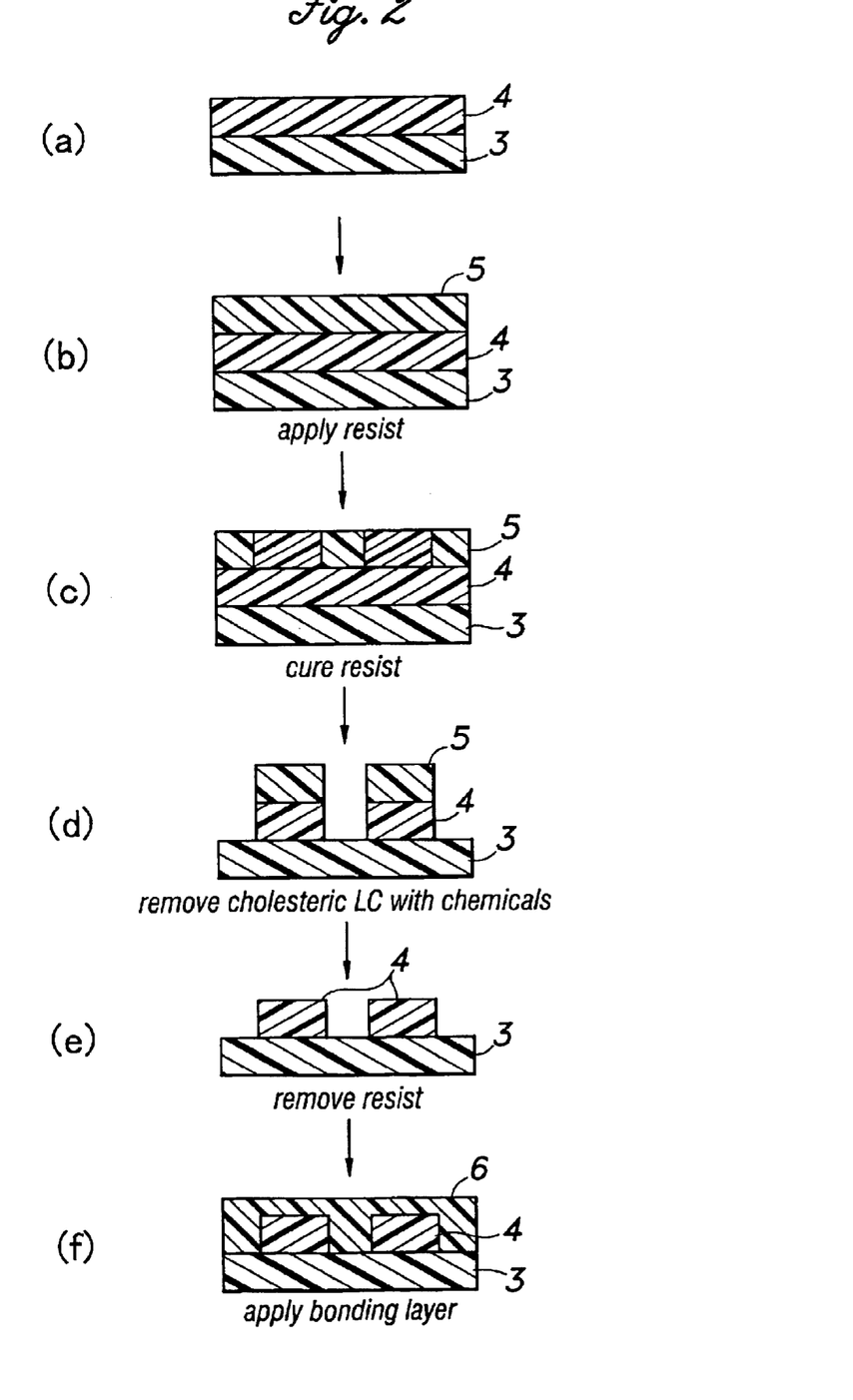
FIG. 2 is a diagram showing the manufacturing process of the identification medium of the first embodiment of the present invention.

FIG. 1 is a plan view showing a first embodiment of the present invention including an identification medium 1 which is affixed generally to an object X or to a prescribed location thereof and consists of a single part or two or more parts, the object consisting of a card, passport, security note, gift certificate or the like. Referring to FIG. 2, the identification medium 1 is formed as a sticker by (a) coating high polymer cholesteric liquid crystal 4 over a base film 3, (b) applying a layer of resist 5 over the assembly, (c) photographically exposing the resist 5 by using a mask having a prescribed pattern as shown in FIG. 1 and curing the resist, (d) etching away the part of the resist which has not cured and the high polymer cholesteric liquid crystal under it by using acid or alkaline chemicals such as nitric acid, hydrochloric acid and ammonium fluoride, (e) removing the remaining resist, and (f) generally applying a coating of a bonding agent or adhesive agent 6. The etching may also consist of dry etching using carbon tetrafluoride, for instance, instead of the wet etching using the above mentioned chemicals.

The identification medium 1 in the form of a sticker is used with the base film 3 facing outward, and is affixed to the object X via the bonding agent or adhesive agent 6.

The bonding agent or adhesive agent 6 has such a high mechanical strength that any attempt to peel off the sticker from the object X will result in the destruction of the high polymer cholesteric liquid crystal 4, thereby preventing the reuse of the sticker.

In practice, the identification medium may also be formed directly on the surface of the object X by the steps of (a) to (e). If high polymer cholesteric liquid crystal 4 is applied to a base film 3 via a peel layer, and a hot melt layer is applied thereon following an etching process, the assembly can be used as a medium for hot stamping which is suitable for mass production. Hot stamping consists of a process by which an ornamental film is transferred onto the surface of an object by using instantaneous heat and pressure.

By etching the high polymer cholesteric liquid crystal 4, highly fine patterns and letters can be formed at will. This contributes to the enhancement of aesthetic quality and the protection of forgery.

Figure 3:
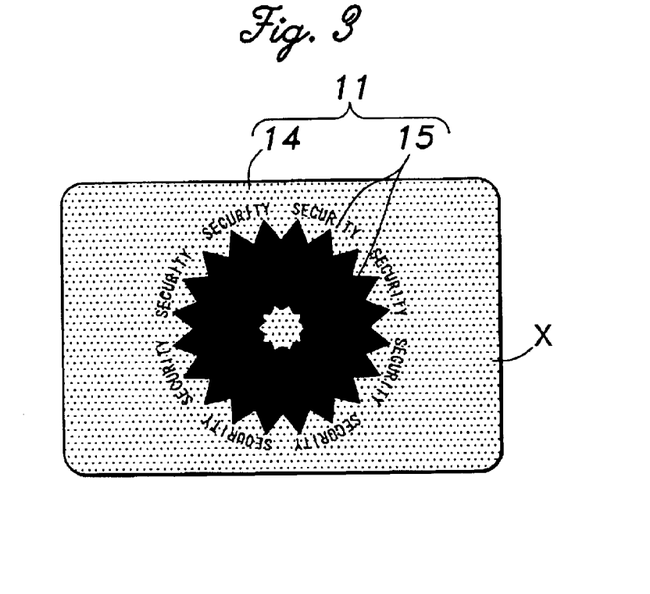
FIG. 3 is a plan view showing an identification medium given as a second embodiment of the present invention.
Figure 4:
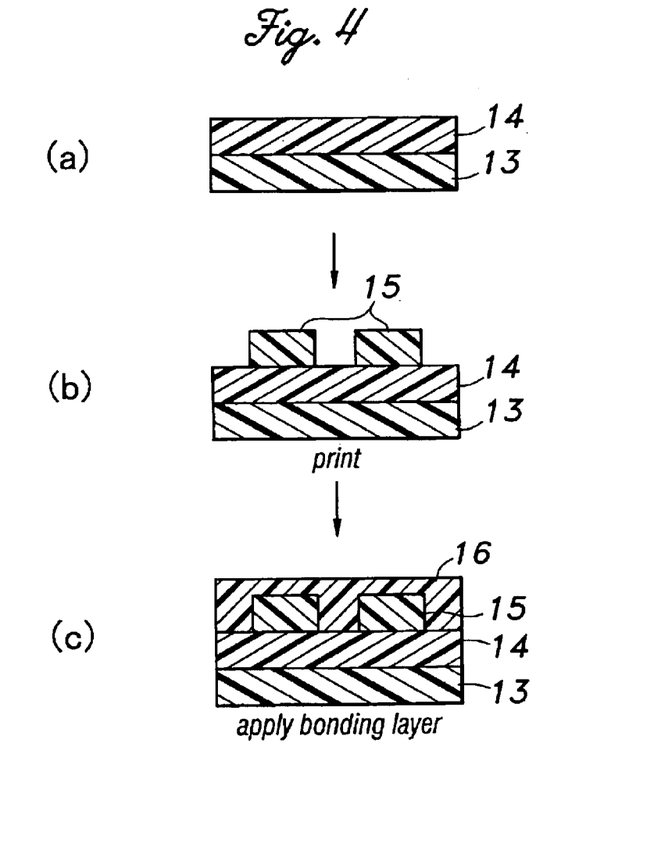
FIG. 4 is a diagram showing the manufacturing process of the identification medium of the second embodiment of the present invention.

FIG. 3 is a plan view showing a second embodiment of the present invention including identification medium 11 which is affixed generally to the surface of an object X or to a prescribed location thereof and consists of one or a plurality of parts. As shown in FIG. 4, the identification medium 11 is prepared in the form of a sticker by (a) coating high polymer cholesteric liquid crystal 14 over a base film 13, (b) printing a layer of ink 15 thereon according to a prescribed pattern as illustrated in FIG. 3, and (c) generally applying a coating of a bonding agent or adhesive agent 16. In this embodiment also, the identification medium may be directly formed on the surface of the object X or may be formed as a medium for hot stamping.

In this embodiment also, the high polymer cholesteric liquid crystal 14 and ink layer 15 may be directly formed on the object X, instead of on the base film 13, as was the case with the first embodiment, and the assembly may also be used as a medium for hot stamping.

Figure 5:
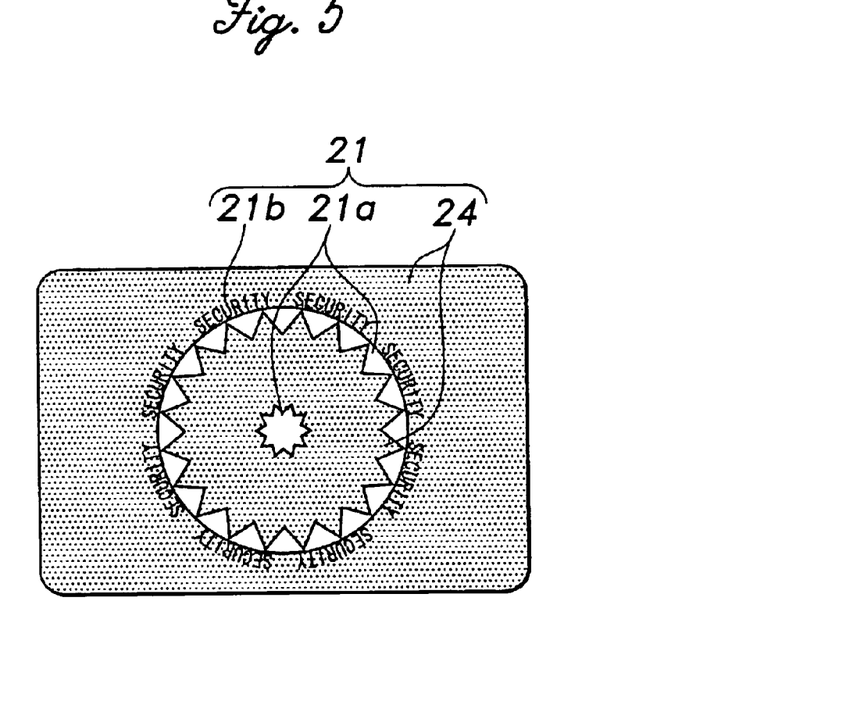
FIG. 5 is a plan view showing an identification medium given as a third embodiment of the present invention.

FIG. 5 is a plan view showing a third embodiment of the present invention including an identification medium 21 which is affixed generally to the surface of an object X or to a prescribed location thereof, and consists of one or a plurality of parts. In this identification medium assembly, a layer of high polymer cholesteric liquid crystal 24 is formed into a desired shape as was done in the first embodiment, and a desired printing process is performed as was done in the second embodiment. Numeral 21a denotes a part which has been etched away, and numeral 21b denotes a part which is printed.

Figure 6:
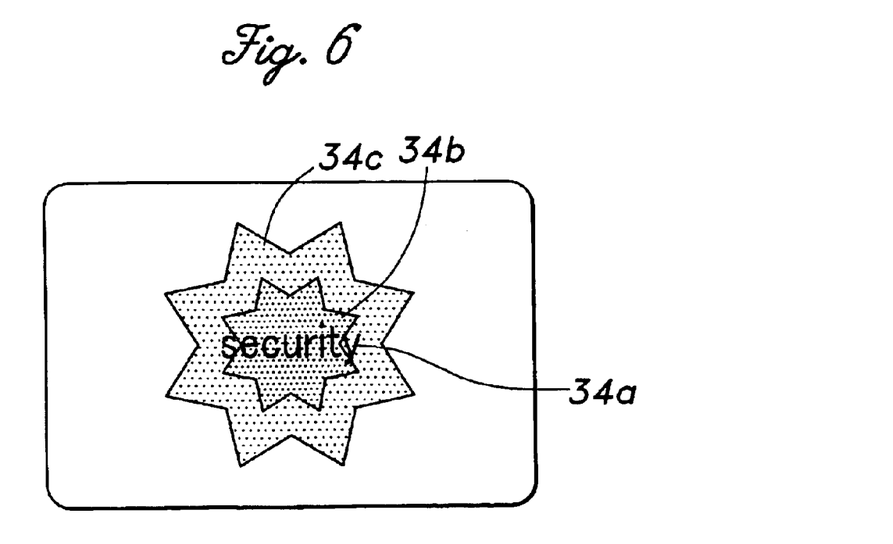
FIG. 6 is a plan view showing an identification medium given as a fourth embodiment of the present invention.

FIG. 6 is a plan view showing a third embodiment of the present invention including an identification medium 31 which is affixed generally to the surface of an object X or to a prescribed location thereof. This identification medium 31 is a combination of three parts of high polymer cholesteric liquid crystal 34a, 34b and 34c having three different kinds of reflective wavelength selectivity and/or circularly polarizing reflective property of a specific direction (right or left). For instance, the medium may include three parts of high polymer cholesteric liquid crystal that reflect right circularly polarized light of three different colors, blue color for the letters 34a, red color for the central star-shaped region 34b and green color for the outer star-shaped region 34c. Therefore, if the surface of the object X is black in color, for instance, the patterns and letters in the three colors can be visually seen. The colors also change depending on the color of the surface of the object X and the color of the bonding agent. When a circularly polarizing filter is used as will be described hereinafter, an even more accurate determination of authenticity becomes possible.

Figure 7A:
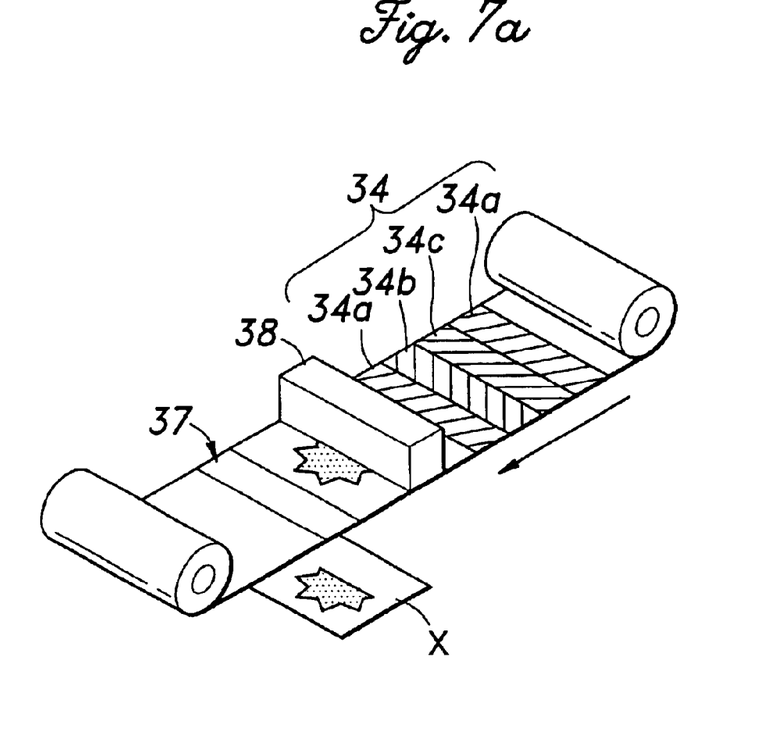
FIG. 7a is a diagram showing a device for manufacturing the identification medium of the fourth embodiment of the present invention.
Figure 7B:
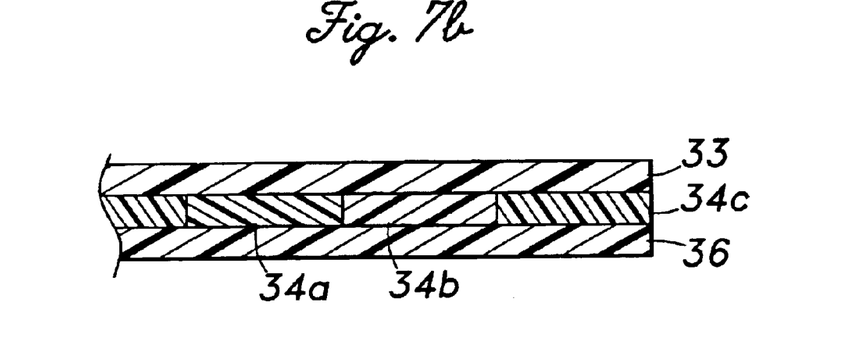
FIG. 7b is a ribbon used in the manufacturing device.

The identification medium 31 is formed by transferring the three parts of high polymer cholesteric liquid crystal 34a, 34b and 34c having different properties supported by a ribbon onto the object X at a prescribed pattern as shown in FIG. 7a. More specifically, as shown in FIG. 7b, the ribbon 37 is formed by placing three parts of high polymer cholesteric liquid crystal on a base film 33 one next to the other, coating a bonding agent 36, and winding the assembly into a roll. Heat is applied to the ribbon by using a thermal head 38 of a thermal printer at a prescribed timing while the ribbon 37 is moved relative to the object X in the same way as in a known thermal printer. Thereby, desired parts of the high polymer cholesteric liquid crystal are peeled off from the base film 33, and are transferred upon the object X at the prescribed pattern.

The process of transferring the corresponding parts of the high polymer cholesteric liquid crystal does not require a metallic die set or a master plate, and allows letters and shapes to be formed at will. In particular, a substantial saving in cost can be achieved when the production batches are small in quantity. By increasing the number of kinds of the high polymer cholesteric liquid crystal that are used, the number of available colors increases.

Figure 8:
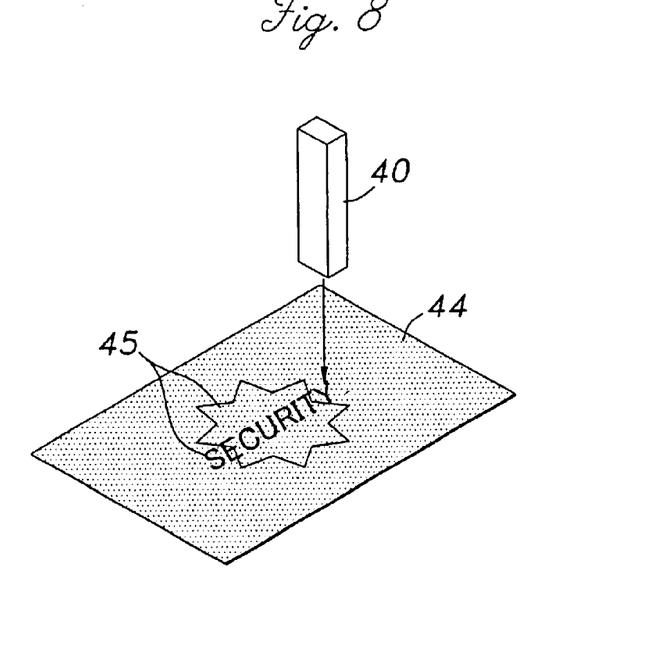
FIG. 8 is a diagram showing the manufacturing process of an identification medium of a fifth embodiment of the present invention.

Furthermore, as shown in FIG. 8, letters and patterns 45 can also be drawn by scorching and discoloring selected parts of the high polymer cholesteric liquid crystal 44 by using a laser device 40. If the power of the laser is controlled, and the scorching process is conducted in a gradual manner, it is possible to change the pitch p (the distance required for each layer to twist by one turn) and change the color of the reflected light. Therefore, letters and patterns can be formed by the parts which are subjected to the laser and have thereby been made to reflect light of different colors.

Figure 9:
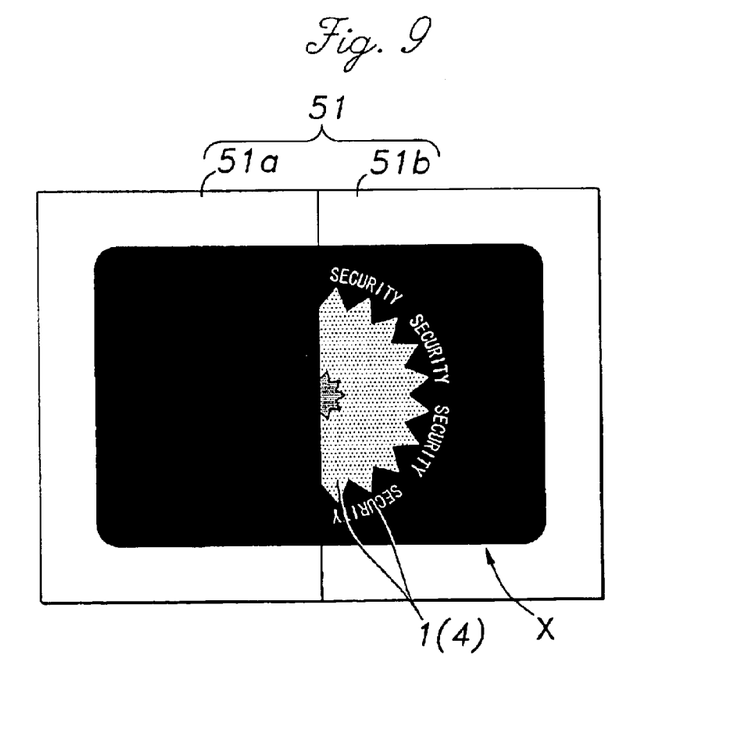
FIG. 9 is a diagram illustrating the manner by which the identification medium of the first embodiment is identified visually by using a right and left circularly polarizing filter.
Figure 10:
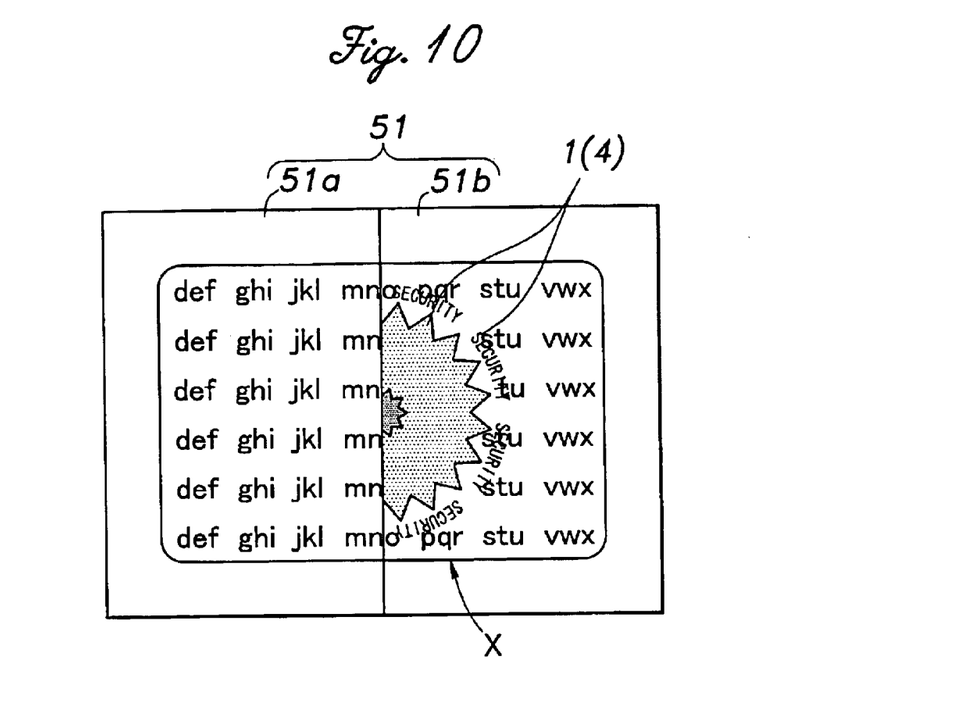
FIG. 10 is a diagram illustrating the manner by which the identification medium of the first embodiment is identified visually by using a right and left circularly polarizing filter.

In the first embodiment, if the high polymer cholesteric liquid crystal 4 of the identification medium 1 reflects only red right circularly polarized light and the bonding agent 6 is transparent while the surface of the object X is black or the bonding agent is black, the view obtained by a simple identification device 51 consisting of a left circularly polarizing filter 51a and a right circularly polarizing filter 51b placed one next to the other will be as given in FIG. 9. More specifically, the right circularly polarizing filter 51b allows the image formed by the high polymer cholesteric liquid crystal 4 of the identification medium 1 that reflects only right circularly polarized light or the graphic pattern of the identification medium 1 to be transmitted or viewed. On the other hand, the left circularly polarizing filter 51a shuts off the graphic pattern of the identification medium 1 from view, and allows only the surface of the object X or the black background of the bonding agent 6 to be viewed. If the bonding agent 6 is transparent and a pattern is formed on the surface of the object X, the identification medium 1 appears semi-transparent, and the surface pattern and graphic pattern of the identification medium show dimly to the naked eye. However, the simple identification device 51 allows only the surface pattern to be viewed as shown in FIG. 10 because the left circularly polarizing filter 51a shuts off the graphic pattern of the identification medium 1.

Figure 11:
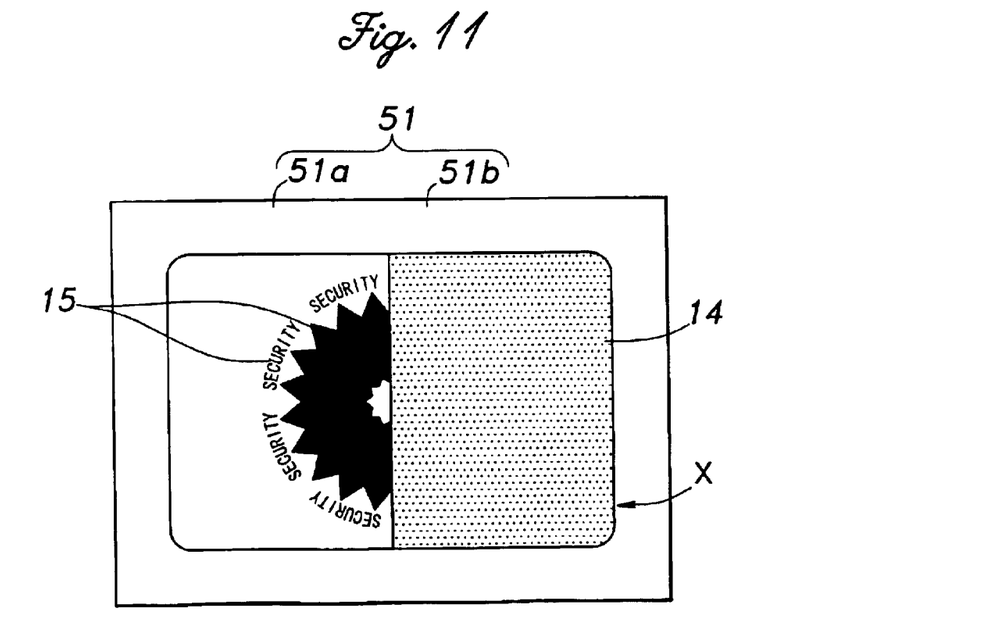
FIG. 11 is a diagram illustrating the manner by which the identification medium of the second embodiment is identified visually by using a right and left circularly polarizing filter.

In the second embodiment, if the high polymer cholesteric liquid crystal 14 of the identification medium 11 reflects only red right circularly polarized light, the view obtained by the simple identification device 51 will be as given in FIG. 11. More specifically, the right circularizing filter 51b transmits only the light reflected by the high polymer cholesteric liquid crystal 14 thereby making the ink 15 or printed image underlying the high polymer cholesteric liquid crystal 14 invisible while the left circularly polarizing filter 51a shuts off the light reflected by the high polymer cholesteric liquid crystal 14 thereby making only the printed image or the ink 15 underlying the high polymer cholesteric liquid crystal 14 visible.

Figure 12:
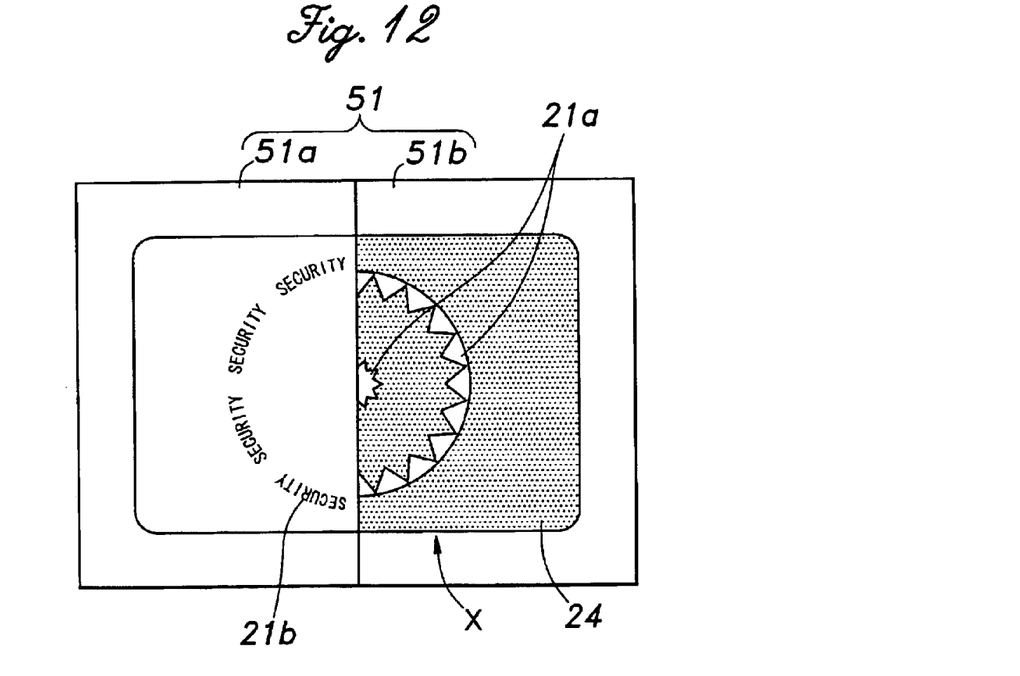
FIG. 12 is a diagram illustrating the manner by which the identification medium of the third embodiment is identified visually by using a right and left circularly polarizing filter.

In the third embodiment, if the high polymer cholesteric liquid crystal 24 of the identification medium 21 reflects only red right circularly polarized light, the view obtained by the simple identification device 51 will be as given in FIG. 12. More specifically, the right circularizing filter 51b makes only the image etched out of the high polymer cholesteric liquid crystal 24 visible while the left circularly polarizing filter 51a shuts off the light reflected by the high polymer cholesteric liquid crystal 24 thereby making only the printed letters 21b visible.

Figure 13:
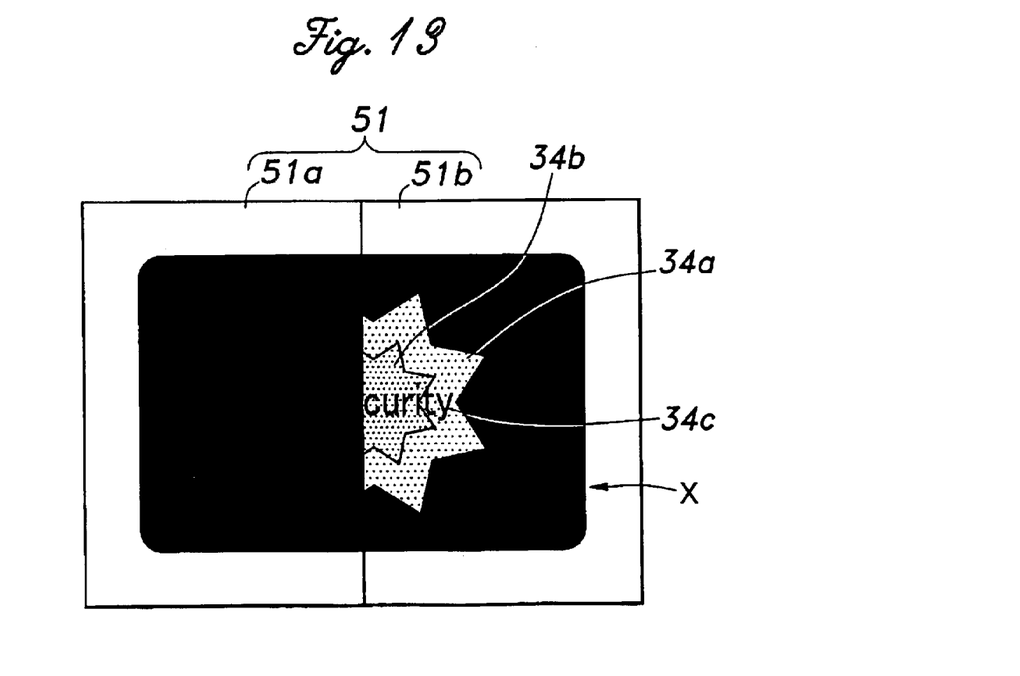
FIG. 13 is a diagram illustrating the manner by which the identification medium of the fourth embodiment is identified visually by using a right and left circularly polarizing filter.
Figure 14:
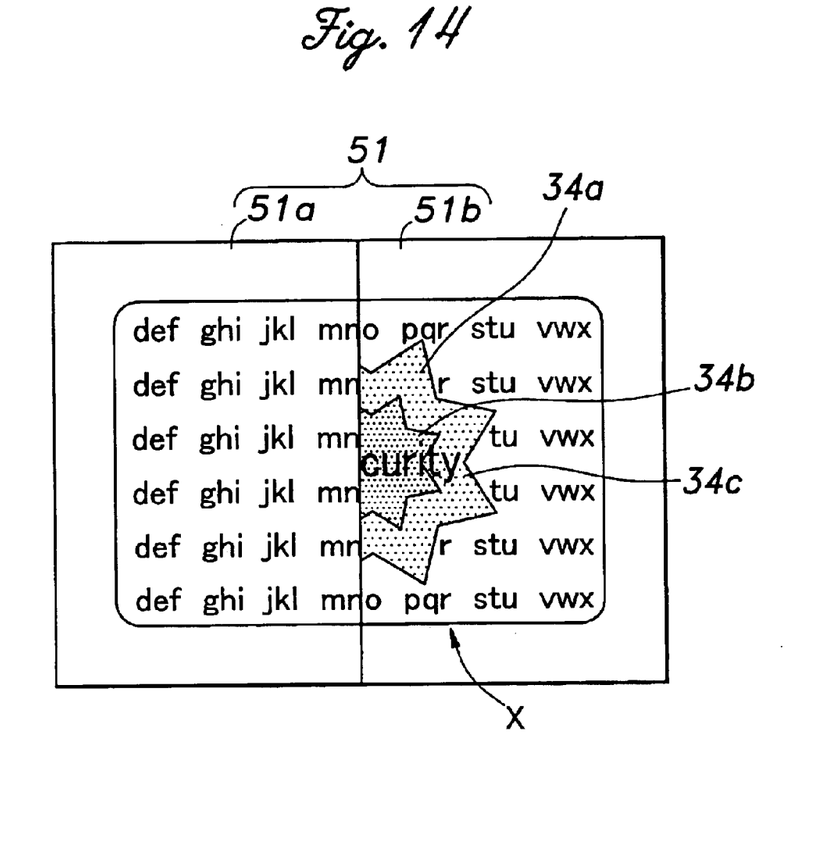
FIG. 14 is a diagram illustrating the manner by which the identification medium of the fourth embodiment is identified visually by using a right and left circularly polarizing filter.

In the fourth embodiment, if the three parts of the high polymer cholesteric liquid crystal 34a, 34b and 34c of the identification medium 31 reflect only right circularly polarized light of different colors, and the bonding agent (not shown in the drawing) is transparent while the surface of the object X is black or the bonding agent is black, the view obtained by a simple identification device 51 will be as shown in FIG. 13 when the bonding agent is black and as shown in FIG. 14 when the bonding agent is transparent. The pattern appears in the same way as the first embodiment illustrated in FIGS. 9 and 10, and only the colors are different.

Figure 15:
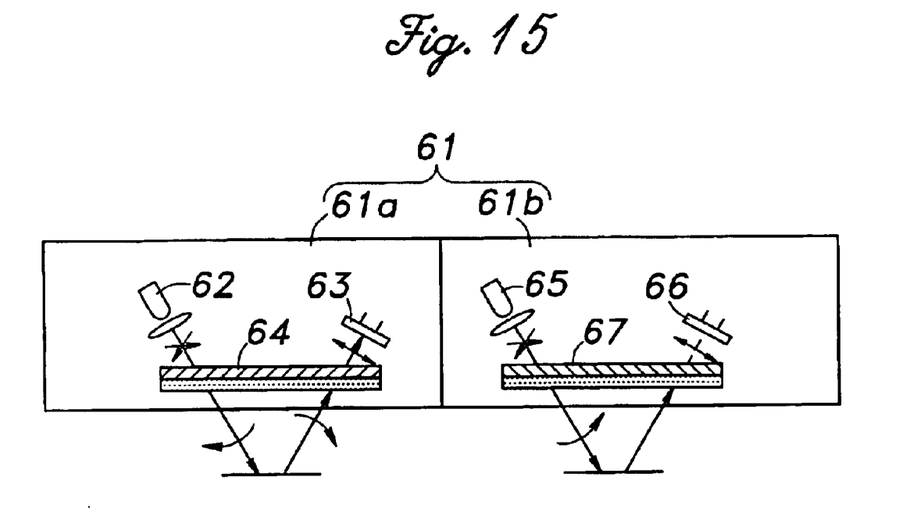
FIG. 15 is a diagram showing the structure of a device for mechanically identifying an identification medium according to the present invention.

The device for mechanically identifying the identification medium such as those given in the first to fifth embodiments is described in the following. Referring to FIG. 15, the identification device 61 consists of a pair identification units 61a and 61b. The identification unit 61a comprises a light source 62, a light receiving unit 63 and a right circularly polarizing filter 64 so that right circularly polarized light is impinged upon the object X and only right circularly polarized light is transmitted to the light receiving unit 63 while left circularly polarized light is shut off. The identification unit 61b comprises a light source 65, a light receiving unit 66 and a left circularly polarizing filter 67 so that left circularly polarized light is impinged upon the object X and only left circularly polarized light is transmitted to the light receiving unit 66 while right circularly polarized light is shut off. The light sources 62 and 65 preferably consist of light bulbs, LEDs or laser sources, but are not limited to them.

Figure 16:
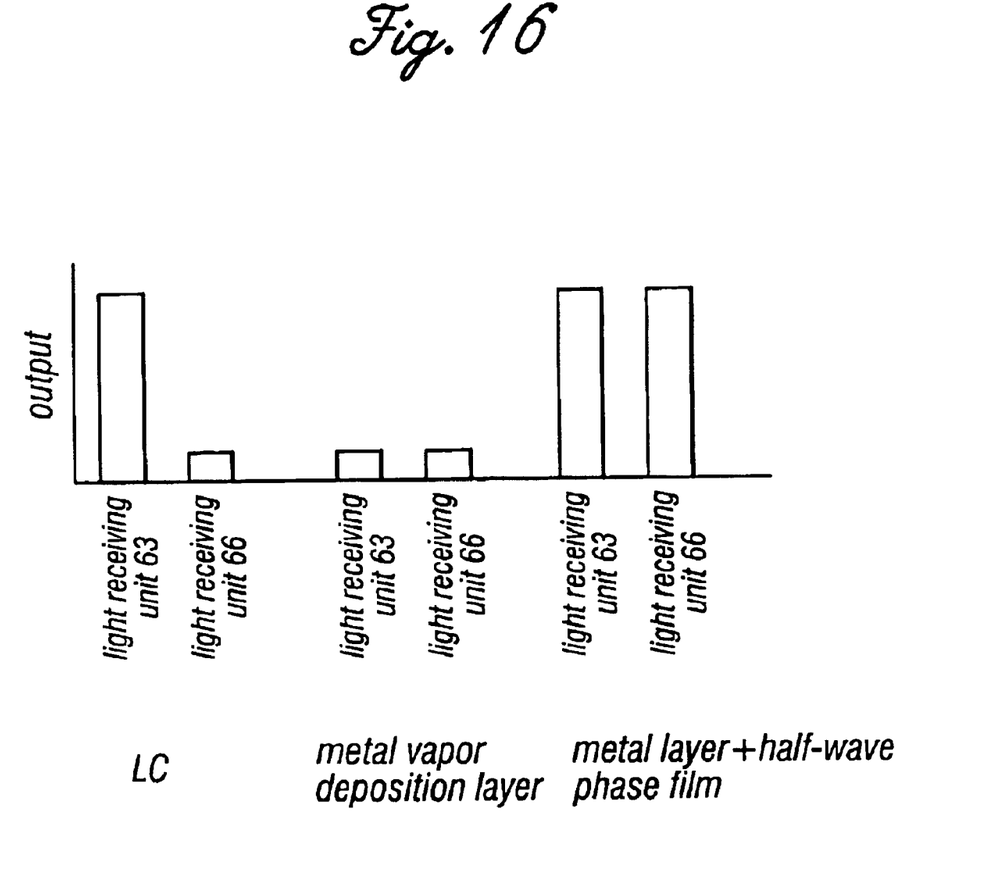
FIG. 16 is a graph showing the output of a light receiving unit of the identification device of FIG. 15.

The light receiving outputs from the light receiving units 63 and 66 of these identification units are given in FIGS. 16 for the cases of an identification medium consisting of high polymer cholesteric liquid crystal, a metallic vapor deposition layer tinted so as to have the appearance of high polymer cholesteric liquid crystal, and a combination of such a metallic vapor deposition layer and a film producing a phase delay of one-half the wavelength.

In the case of high polymer cholesteric liquid crystal, the light receiving unit 63 of the identification unit 61a produces an output because the right circularly polarized light reflected by the high polymer cholesteric liquid crystal transmits through the right circularly polarizing filter 64 while the light receiving unit 66 of the identification unit 61b does not produce an output because left circularly polarized light is impinged upon the high polymer cholesteric liquid crystal, and no light is reflected therefrom.

In the case of a metallic vapor deposition layer, there is no substantial output from the light receiving unit 63 because right circularly polarized light is reversed by the metallic vapor deposition layer in the identification unit 61 a and converted into left circularly polarized light which is in turn shut off by the right circularly polarizing filter 64. There is also no substantial output from the light receiving unit 66.

When a phase delay film is placed over the metallic vapor deposition layer, an output is obtained from the light receiving unit 63 because right circularly polarized light is not reversed by the metallic vapor deposition layer in the identification unit 61a and reflected as right circularly polarized light which in turn transmits through the right circularly polarizing filter 64. Similarly, an output is obtained from the light receiving unit 66.

Thus, when high polymer cholesteric liquid crystal is used, when a metallic vapor deposition layer is used, and when a combination of a metallic vapor deposition layer and a half-wavelength phase delay film is used, different kinds of output are obtained. The presence of high polymer cholesteric liquid crystal can be determined depending on if the received light output ratio (output from the light receiving unit 66/output from the light receiving unit 63) is substantially zero or not. The authenticity can be therefore easily and accurately determined from the pattern (figures and patterns).

Figure 17A:
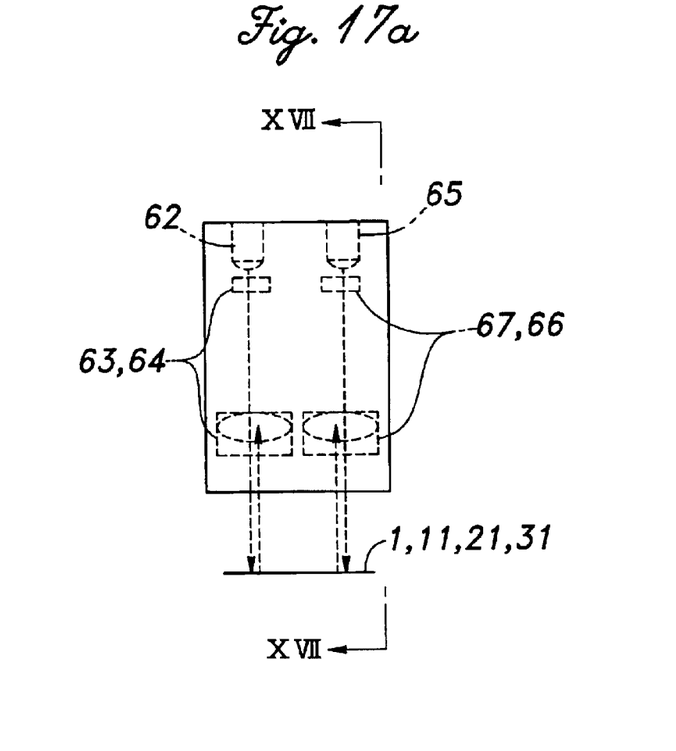
FIG. 17a is a front view showing an actual exemplary layout and structure of the identification device of FIG. 15.
Figure 17B:
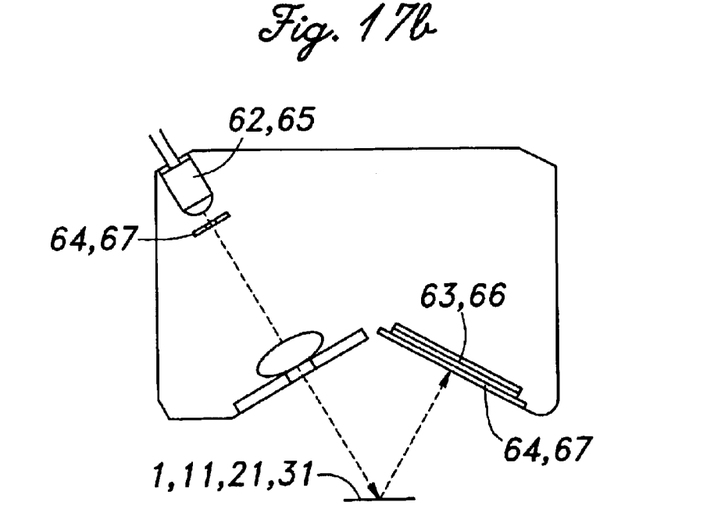
Figure 18A:
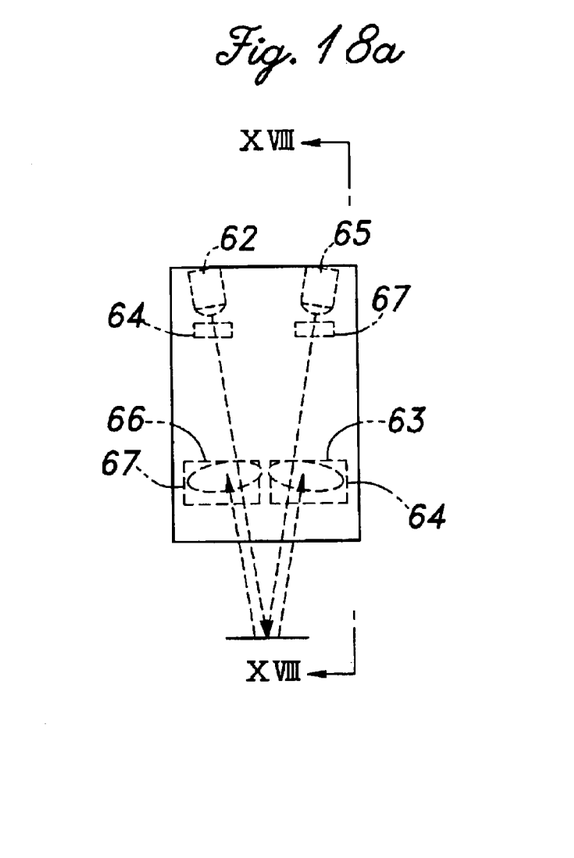
FIG. 18a is a front view showing another actual exemplary layout and structure of the identification device of FIG. 15.
Figure 18B:
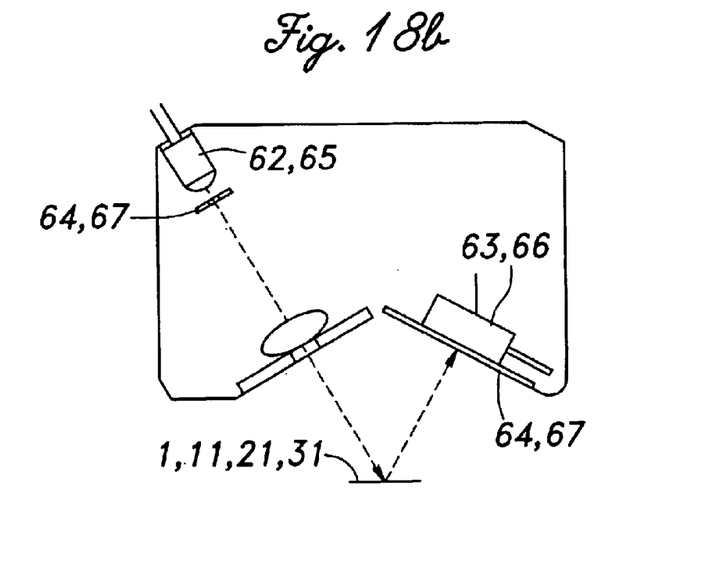

FIGS. 17a and 17b show a possible actual structure of the identification device 61. FIGS. 18a and 18b show another possible actual structure of the identification device 61. The identification device 61 shown in FIGS. 17a and 17b includes the identification unit 61a and identification unit 61b which are arranged parallel to each other so as to identify two different points of an identification medium having a certain width, independently from each other. The identification device 61 shown in FIGS. 18a and 18b includes the identification unit 61a and identification unit 61b which are arranged in a mutually crossing relationship so as to impinge light upon a same point and simultaneously identify a same point of the identification medium. The latter case allows the size of the identification object to be minimized, and the identification reliability to be improved.

The identification media described above may be formed on various cards, gift certificates and photographs of IDs and passports, and may also be formed into paper in the form of tape such as thread hologram.

Although the present invention has been described in terms of preferred embodiments thereof, it is obvious to a person skilled in the art that various alterations and modifications are possible without departing from the scope of the present invention which is set forth in the appended claims.

What is claimed is:

1. An identification medium for identifying an authenticity of an object either visually or optically by using an identification device, characterized by that:

the identification medium comprises high polymer cholesteric liquid crystal which is patterned and/or is provided with a graphic representation layer such as a figure and letter underlying or overlying the high polymer cholesteric liquid crystal, the high polymer cholestric liquid crystal being partly modified by laser so as to change a pitch of adjacent layers of the cholesteric liquid crystal and change a color of reflected light according to a prescribed pattern.

2. An identification medium according to claim 1, wherein the identification medium comprises high polymer cholesteric liquid crystal which is patterned by etching.

3. An identification medium according to claim 1, wherein the identification medium comprises a printed layer underlying the high polymer cholesteric liquid crystal.

4. An identification medium according to claim 1, wherein the identification medium comprises high polymer cholesteric liquid crystal which is thermally transferred according to a prescribed pattern.

5. A method for making an identification medium for identifying an authenticity of an object either visually or optically by using an identification device, characterized by the steps of:

applying high polymer cholesteric liquid crystal onto the object, onto a sticker adapted to be affixed to the object or onto a base for hot stamping onto the object; and patterning the high polymer cholesteric liquid crystal, and/or forming a graphic representation layer such as a figure and letter under or aver the high polymer cholesteric liquid crystal; and partly modifying the high polymer cholesteric liquid crystal by laser so as to change a pitch of adjacent layers of the cholesteric liquid crystal and change color of reflected light according to a prescribed pattern.

6. A method for snaking an identification medium according to claim 5, wherein the high polymer cholesteric liquid crystal is patterned by etching.

7. A method for making an identification medium according to claim 5, wherein an ink layer underlying the high polymer cholesteric liquid crystal is formed by printing.

8. A method for making an identification medium according to claim 5, wherein the high polymer cholesteric liquid crystal is thermally transferred onto the object, onto a sticker adapted to affixed to the object or onto a base for hot stamping onto the object according to a prescribed pattern.

* * * * *

UNITED STATES PATENT AND TRADEMARK OFFICE
CERTIFICATE OF CORRECTION

PATENT NO. : 6,740,431 B2
DATED : May 25, 2004
INVENTOR(S) : Hoshino et al.

It is certified that error appears in the above-identified patent and that said Letters Patent is hereby corrected as shown below:

Title page, Item [54] and Column 1, line 1,
Title, "MEDIUM FOR IDENTIFYING MATTER TO BE IDENTIFIED AND METHOD FOR PRODUCTION THEREOF" should read -- MEDIUM FOR IDENTIFYING AN OBJECT AND METHOD FOR MAKING THE SAME --.

Column 3,
Line 61, "line XVII-XVII of" should read -- line XVIII-XVIII of --.

Column 7,
Line 23, "unit 61 a and" should read -- unit 61a and --.

Column 8,
Line 43, "or aver the high" should read -- or over the high --.
Line 47, "and change color" should read -- and change a color --.
Line 49, "for snaking an" should read -- for making an --.

Signed and Sealed this

Thirty-first Day of May, 2005

JON W. DUDAS
*Director of the United States Patent and Trademark Office*